United States Patent [19]

Shinohara

[11] Patent Number: 4,778,124
[45] Date of Patent: Oct. 18, 1988

[54] LINE RETAINING MEANS FOR A SPINNING REEL

[75] Inventor: Eiji Shinohara, Tokyo, Japan

[73] Assignee: Daiwa Seiko Co., Ltd., Tokyo, Japan

[21] Appl. No.: 103,127

[22] Filed: Sep. 30, 1987

[30] Foreign Application Priority Data

Sep. 30, 1986 [JP] Japan ................... 61-150603

[51] Int. Cl.$^4$ ............................................. A01K 89/01
[52] U.S. Cl. ........................ 242/84.21 R; 242/84.2 R
[58] Field of Search ................... 242/84.21 R, 84.2 R

[56] References Cited

U.S. PATENT DOCUMENTS 3,946,963  3/1976  Oberg .................. 242/84.21 R
4,561,604  12/1985 Matsushima ........... 242/84.21 R
4,618,107  10/1986 Nakajima .............. 242/84.21 R

FOREIGN PATENT DOCUMENTS 2931661  5/1981  Fed. Rep. of Germany ..... 242/84.2 R

Primary Examiner—Stuart S. Levy
Assistant Examiner—Katherine Matecki
Attorney, Agent, or Firm—Cushman, Darby & Cushman

[57] ABSTRACT

A spinning reel for fishing wherein the reciprocating spool has a rearward flange which is engaged with rollers supported on support rods which are attached to the surrounding rotor and bailing mechanism. In this manner, a fishing line is prevented from dropping behind and off of the reciprocating spool when either fishing line is wound onto or cast off of the spool.

10 Claims, 2 Drawing Sheets

LINE RETAINING MEANS FOR A SPINNING REEL

FIELD OF THE INVENTION

The present device relates to spinning reels for winding and unwinding fishing line. More particularly, the present device relates to a mechanism for preventing a fishing line from becoming entangled behind the rotor and spool on a reciprocating spool spinning reel.

BACKGROUND OF THE INVENTION

In prior art spinning reel devices, there has existed a particularly bothersome problem of the fishing line becoming caught within the mechanism of the reel. Specifically, the fishing line is insufficiently contained and is able to loop beneath the spool on which it is wound and wrap around the shaft supporting the spool. This entanglement is particularly troublesome because the spool is prevented from freely reciprocating in the intended manner. As such, when the fishing line is permitted to drop beneath the spool, the fishing reel is prevented from either further casting of the line or rewinding of the line.

Prior art solutions to this bothersome entangling between the fishing line and the spool or rotating bail, has been to provide an extended angular stopper around a peripheral portion of the rearward edge of the spool. In this manner, the gap between the surrounding and rotating bailing mechanism and the spool is reduced so that a line is impeded in its drop between the spool and the bailing mechanism. This prior art solution has the problem that the peripheral stopper frictionally engages the surrounding rotating bailing mechanism and impairs the performance thereof. Not only does this cause additional jamming problems, but also a distracting noise is present upon rotation.

It is the object of this invention to eliminate the chances of a fishing line dropping beneath the reciprocating spool to cause jamming thereof. This object is accomplished by providing supporting arms attached to the bailing mechanism on which rollers are rotatably mounted and which engage a rearward flange on the reciprocating spool. In this manner, there is continuous engagement between the spool and the winding mechanism so that a fishing line is prevented from dropping therebetween.

Other objects, features, and characteristics of the present invention, as well as the methods and operation and functions of the related elements of the structure, and to the combination of parts and economies of manufacture, will become apparent upon consideration of the following description and the claims with reference to the accompanying drawings, all of which form a part of this specification.

DETAILED DESCRIPTION OF THE PREFERRED EMBODIMENT

Figure 1:
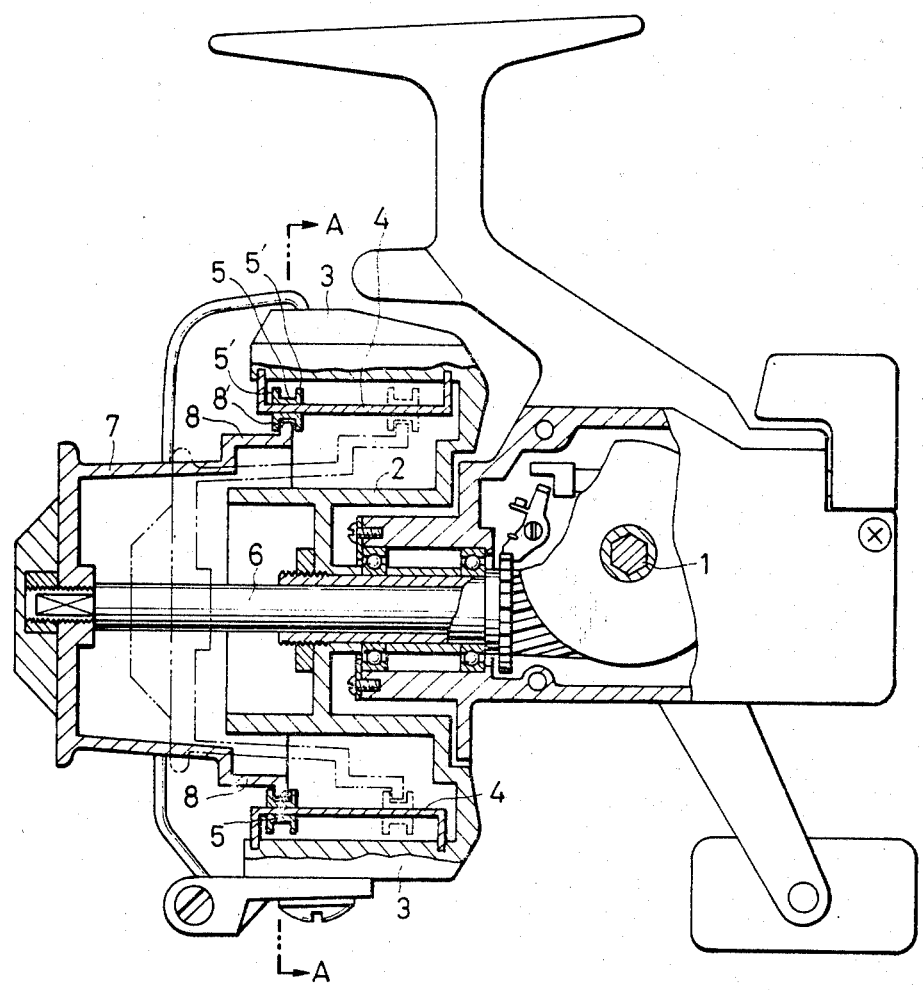
FIG. 1 is a cross-sectional view of a spinning reel embodying the present invention.
Figure 2:
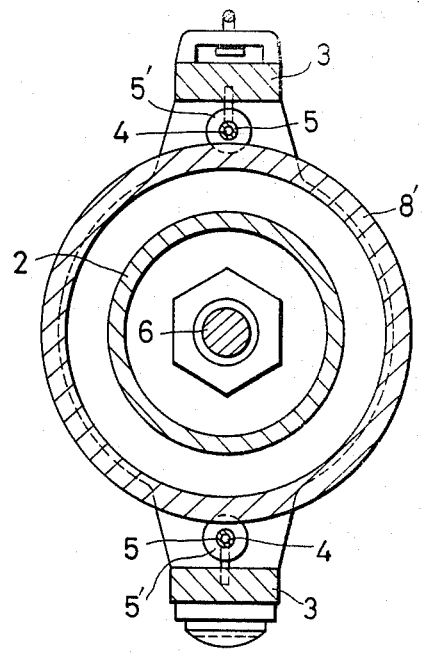
FIG. 2 is a sectional view of a spinning reel embodying the present invention along section 2—2 of FIG. 1.

With reference to FIGS. 1 and 2, a description of a first embodiment of the spinning reel according to the present invention will follow. FIG. 1 illustrates a cut-away view of a spinning reel of the reciprocating spool type. The reciprocation and winding mechanisms are of a conventional sort with the cranking of handle shaft 1 driving gearing and reciprocating mechanisms so that rotor 2 spins while spool shaft 6 reciprocates.

Spool 7 is mounted on a front end of spool shaft 6. In this manner, as spool shaft 6 is mecha-nically reciprocated, spool 7 is also reciprocated in connection therewith. Surrounding the spool is rotor 2. Each half of rotor 2 is basically U-shaped with bail attaching arms 3 forming one side of the upright U. Attached to the bail attaching arms 3 are support rods 4. These support rods have rotatably mounted thereon rollers 5. Each roller has a pair of flanges 5' associated therewith which rotatably engage a peripheral projection 8' of spool flange 8.

The following sequence of operation is observed by the previously described mechanism. When handle shaft 1 is rotated, spool shaft and the connected spool 7 reciprocate in a longitudinal manner. Simultaneously, rotor 2 is spun around the outside of the reciprocating spool 7 so that a bailing mechanism (shown but not labelled) can wind fishing line onto the spool. In order to prevent fishing line from slipping rearwardly over spool flange 8, spool 7 is provided with an additional projection 8' which engages and rides against roller 5 and is contained by the associated flanges 5'. The rollers 5 are able to slide along support rod 4 and reciprocate according to the motion imparted thereto by the reciprocating spool 7. In this manner, continuous contact is maintained between the rollers 5 and spool flange projection 8'. Fishing line which is being either wound onto spool 7, or cast off of spool 7, is prevented from falling rearwardly past projection 8' beneath the spool and into the winding/reciprocating mechanism area.

A spinning reel according to the present invention prevents a fishing line from slipping behind the spool 7 while preserving free spinning reel operation. The rollers 5 are slidably and rotatably mounted on support rods 4 so as to provide minimal impairment of spool reciprocation and rotor rotation.

Figure 3:
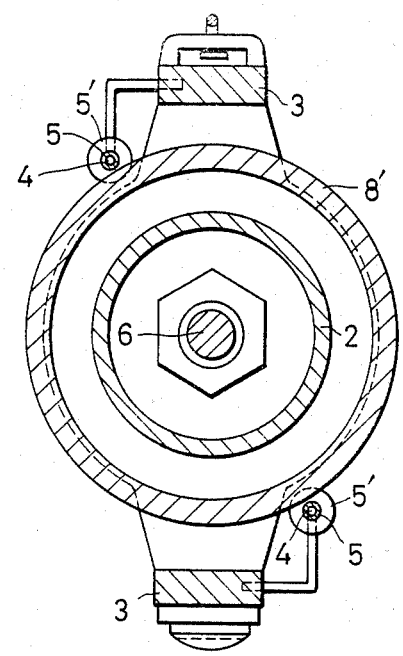
FIG. 3 is a cross-sectional view of a spinning reel embodying another embodiment of the present invention along a section similar to that shown in FIG. 2.

FIG. 3 illustrates a second embodiment of a spinning reel according to the present invention. In this embodiment, support rods 4 are mounted to a side surface of attaching arms 3. In this manner, increased access is provided to the support arms 4 and associated rollers. The support arms 4 are merely L-shaped at their ends so as to provide side surface attachment to attaching arms 3. The support rods 4 still maintain their parallel longitudinal relationship to the direction of reciprocation of spool 7.

Figure 4:
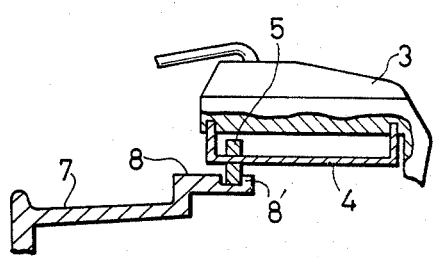
FIG. 4 is a partial cross-sectional view of another embodiment of a spinning reel according to the present invention.

FIG. 4 illustrates a third embodiment of a spinning reel according to the present invention. In this embodiment, the spool flange 8 is provided with a pair of rearward flanges 8'. In this manner, instead of providing two flanges on roller 5, a pair of flanges 8' is provided on spool flange 8. Roller 5 is then engaged between the pair of flanges 8' and, as in the previously discussed embodiments, reciprocates rotatably along support rod 4. It should be noted, that this configuration of spool flanges 8' and roller 5 can be used with either of the support rod configurations disclosed in FIGS. 2 and 3. The only distinction being that the guide flanges for proper engagement between the rollers 5 and spool 7, are provided on the spool instead of on the rollers themselves.

Figure 5:
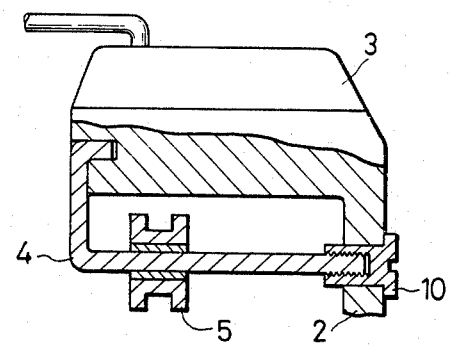
FIG. 5 is a partial cross-sectional view similar to FIG. 4 of another embodiment of a spinning reel according to the present invention.

FIG. 5 illustrates a final embodiment of the present invention, wherein a third variation on the attachment of supporting rod 4 to attaching arm 3 is provided. In this embodiment, support rod 4 is generally J-shaped with the front portion of support rod 4 being hooked into a front surface of attaching arm 3. The rearward end of support rod 4 is fixedly attached to the base of rotor member 2. Of course, the longitudinally parallel relationship between support rod 4 and the spool reciprocation direction is preserved. In this manner, roller 5 is able to simultaneously rotate about support rod 4 and reciprocate therealong in conjunction with the reciprocation of spool 7.

An additional feature of this fourth embodiment, is that the support rod is detachably secured to rotor 2 and attaching arm 3 by means of a rearwardly located stopping screw 10. Rotor 2 is provided with an axial hole in the base member thereof through which stopping screw 10 may engage and fasten a threaded rearward portion of support rod 4. In this manner, support rods 4 are conveniently removable for maintenance and/or replacement.

It should also be noted that this fourth embodiment can be used with a roller and spool arrangement similar to that disclosed in FIG. 4. That is, that instead of roller 5 having the engaging flanges located thereon, a rearward portion of spool 7 has the engaging flanges located thereon.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A spinning reel for fishing line, comprising:
a spool having an axis, a front end and a rear end with a radially extended first rearward flange thereon; and
bail support and rotating means connected to and surrounding said spool for winding fishing line onto said spool, said bail support means comprising attaching arms extending longitudinally beside said spool axis, said attaching arms having longitudinal support rods attached and extending parallel thereto, said support rods having rollers slidably mounted thereon for engagement with said first rearward flange of said spool.

2. A spinning reel as in claim 1, wherein:
said spool is connected to reciprocating means for reciprocating said spool in a longitudinal direction as fishing line is wound thereon.

3. A spinning reel as in claim 2, wherein:
said rollers have a pair of radially extending flanges located thereon which engage said first rearward flange of said spool on either side thereof.

4. A spinning reel as in claim 3, wherein:
said support rods are mounted along a surface of said attaching arms, said surface facing said spool.

5. A spinning reel as in claim 3, wherein:
said support rods are mounted along a side surface of said attaching arms, said side surface being obliquely related to a surface of said attaching arms which faces said spool.

6. A spinning reel as in claim 3, wherein:
said bail support means comprises a base portion to which said attaching arms are connected such that said bail support means is substantially U-shaped, and said support rods each have a front and a back end;
each said front end of said support rods being attached to a respective front surface of one of said attaching arms, and said back ends being attached to said base portion of said bail support means.

7. A spinning reel as in claim 2, wherein:
said spool further comprises a second radially extended rearward flange axially displaced from said first rearward flange, defining an axially bounded circumferential surface on said spool, said rollers engaging said spool along said circumferential surface.

8. A spinning reel as in claim 7, wherein:
said support rods are mounted along a surface of said attaching arms, said surface facing said spool.

9. A spinning reel as in claim 7, wherein:
said support rods are mounted along a side surface of said attaching arms, said side surface being obliquely related to a surface of said attaching arms which faces said spool.

10. A spinning reel as in claim 7, wherein:
said bail support means comprises a base portion to which said attaching arms are connected such that said bail support means is substantially U-shaped, and said support rods each have a front and a back end;
each said front end of said support rods being attached to a respective front surface of one of said attaching arms, and said back ends being attached to said base portion of said bail support means.

* * * * *